Aug. 31, 1948.  M. P. H. PETERSON  2,448,274
FEMALE JIG FOR CENTRIFUGAL FORMATION
OF SHEET THERMOPLASTICS
Filed July 3, 1946    2 Sheets-Sheet 1

Inventor
Mauritz P.H. Peterson

By A.H. Oldham
Attorney

Aug. 31, 1948.  M. P. H. PETERSON  2,448,274
FEMALE JIG FOR CENTRIFUGAL FORMATION
OF SHEET THERMOPLASTICS
Filed July 3, 1946  2 Sheets-Sheet 2

Inventor
Mauritz P. H. Peterson

By
A H Oldham
Attorney

Patented Aug. 31, 1948

2,448,274

UNITED STATES PATENT OFFICE 2,448,274

FEMALE JIG FOR CENTRIFUGAL FORMATION OF SHEET THERMOPLASTICS

Mauritz P. H. Peterson, Akron, Ohio, assignor to Goodyear Aircraft Corporation, Akron, Ohio, a corporation of Delaware Application July 3, 1946, Serial No. 681,254

7 Claims. (Cl. 18—19)

This invention relates to the improvement of apparatus for centrifugally forming canopies and similar articles from sheets of thermoplastic material.

The present invention is a modification of the invention shown and described in an application of Robert Mayne, Serial No. 585,504, filed March 29, 1945, and entitled "Methods and apparatus for centrifugally forming of sheet thermoplastics."

The improvement of this invention over the construction of the above-cited application consists mainly therein that a female jig is used for centrifugally forming a heated thermoplastic sheet into a desired article. For in using a female jig, it is much easier to insert the sheet in the jig and in considerably less time than with the use of other supporting means. Since a heated sheet cools rather rapidly it is very important that the time for manipulating the sheet before centrifugal forming commences is as short as possible, in order to keep the sheet for this purpose in a plastic, formable state. The duration of this state is extended by the use of a cover preferably permanently attached to the jig to enclose the outer surface of the sheet, thereby preventing its contact with open air and, accordingly, rapid heat dissipation, which might cause premature solidification of the sheet material.

It is the general object of the invention to avoid and overcome the foregoing and other difficulties of and objections to prior art practices by the provision of a jig construction permitting a more rapid attachment of the previously heated sheet to the jig.

Another object of this invention is to provide the jig with a cover to prevent flow of open air past the outside surface of the sheet to avoid a too rapid heat dissipation.

The aforesaid objects of the invention, and other objects which will become apparent as the description proceeds, are achieved by employment of a rotatable jig of the type described above.

Figure 1:
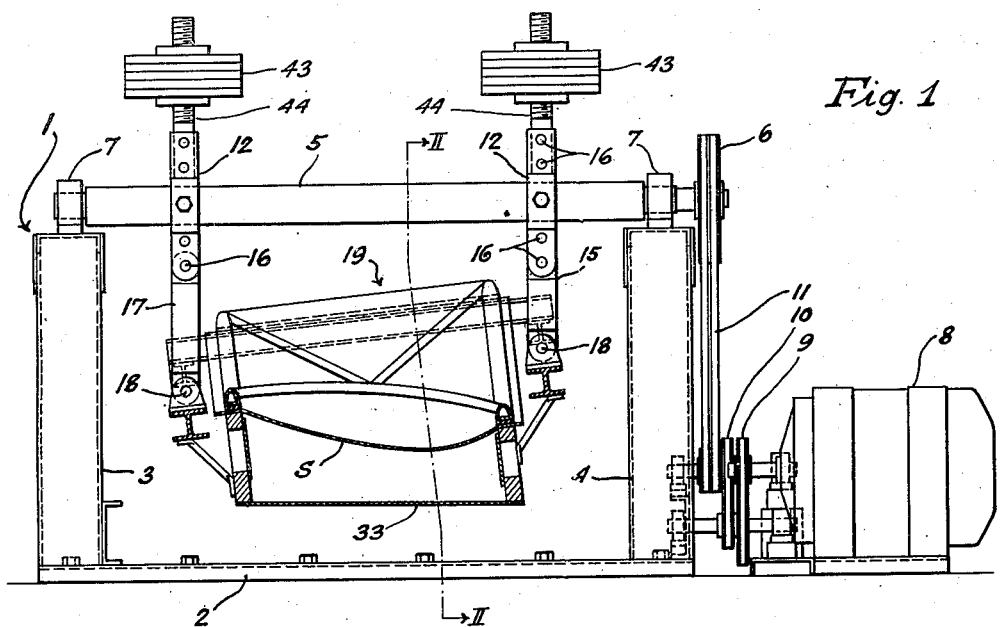
Figure 2:
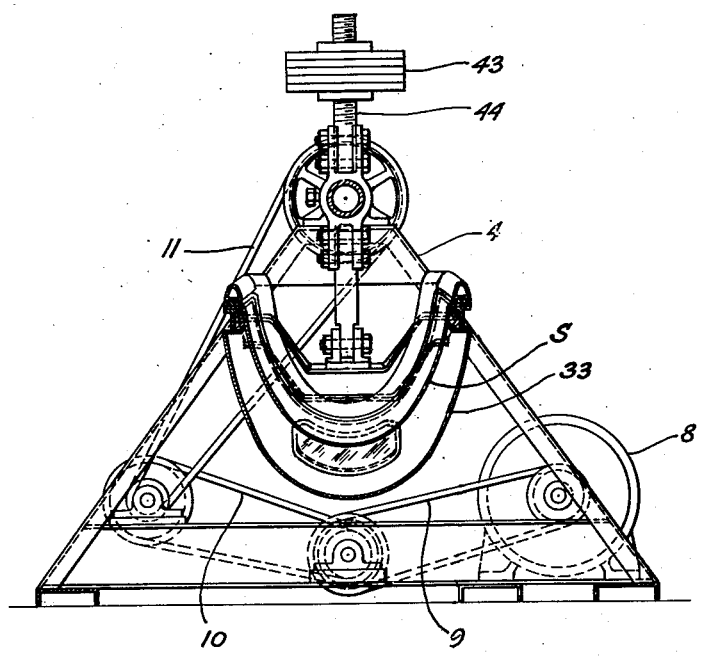
Figure 3:
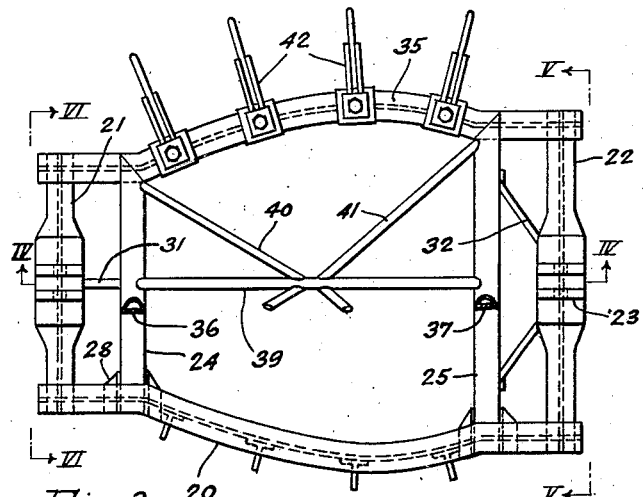
Figure 5:
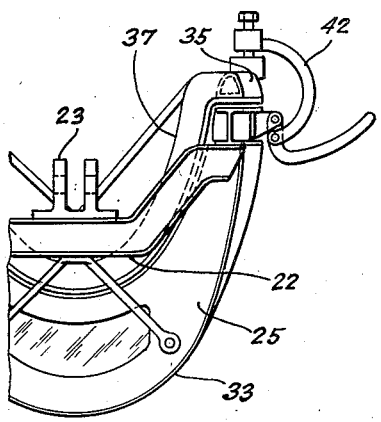
Figure 4:
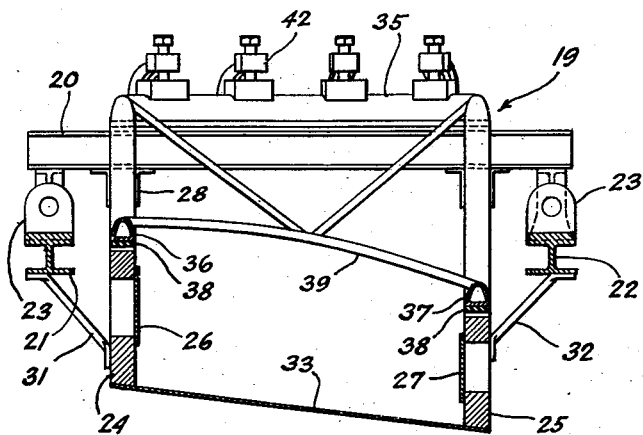
Figure 6:
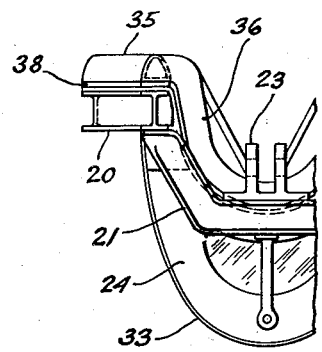
Figure 7:
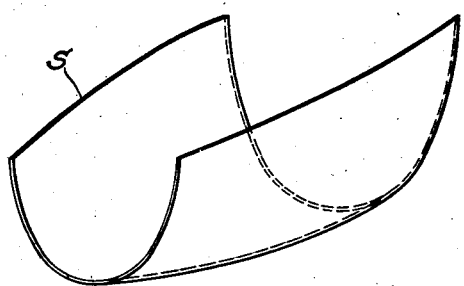

For a better understanding of the invention reference should be had to the accompanying drawings, wherein Fig. 1 is a side elevation of one embodiment of the invention showing the jig in section, Fig. 2 is a cross-sectional view taken on the line II—II of Fig. 1, Fig. 3, in somewhat larger scale, is a top view of the jig with a portion of the top frame broken off, Fig. 4 is a longitudinal cross-sectional view taken on line IV—IV of Fig. 3, Fig. 5 is a fragmentary end view taken on line V—V of Fig. 3, Fig. 6 is a fragmentary end view taken on line VI—VI of Fig. 3, and Fig. 7 is a perspective view of an article made of a thermoplastic sheet by the apparatus.

Although the principles of the invention are broadly applicable to the forming of any thermoplastic sheet material it is particularly useful for the formation of transparent plastics such as methyl methacrylate, which is better known under the trade name "Plexiglas."

With specific reference to the form of the invention illustrated in the drawings, the numeral 1 indicates, as a whole, a supporting framework consisting of base channels 2 on which are mounted two spaced triangular supports 3 and 4, made up of U-channels, preferably welded together. A rotatable shaft 5, provided at one end with a belt pulley 6, is carried in bearings 7 mounted on the supports 3 and 4. For revolving the shaft 5 the pulley 6 is connected to an electric motor 8 by a driving belt system 9, 10 and 11. To the shaft 5 are adjustably attached two cross heads 12 spaced from each other and both slotted at opposite ends. From one of the cross heads 12 extends a jig supporting arm 15 securely fixed thereto by bolts 16, whereas from the other cross head extends a supporting arm 17 pivotally attached thereto by a bolt 16. To the free ends of the supporting arms 15 and 17 is attached by bolts 18 the forming jig 19, indicated as a whole.

The jig 19 consists of a base frame, including longitudinal contour forming members 20, connected together by transverse end members 21 and 22, each of them provided with a hinge 23 by which the base frame is attached to the supporting arms 15 and 17, respectively. Transverse contour forming members 24 and 25, usually made of plastic material, provided with windows 26 and 27, respectively, for observing the formation of the sheet are fastened by brackets 28 to the longitudinal contour forming members, and braces 31 and 32 support the end contour forming members 24 and 25 against the base frame. A cover 33, securely attached to the transverse contour forming members and extending between the longitudinal contour forming members, encloses the outside surface of the sheet S to be formed, thereby preventing at this side during the forming process cold air contact with the hot sheet and, accordingly, rapid dissipation of heat. Of course, a similar cover could be also attached to the clamping frame, or only thereto. For better observation of the formation of the article through the windows 26 and 27 an electric light may be placed within the jig.

For holding the sheet S while being formed in the jig, a clamping frame is made to fit over the base frame. This clamping frame consists of longitudinal side members 35 and transverse end members 36 and 37, all welded into one unit, and is provided at the bottom of these members with a rubber gasket 38 contacting the edge portions of sheet S. Stiffening braces 39, 40 and 41 are provided between the transverse or end members of the clamping frame, which holds the sheet S against the base frame by a number of suitably spaced quick-release clamps 42 secured to the members 20 of the base frame. In order to prevent slipping of the sheet in the jig while being formed, the faces of the base frame with which the sheet contacts are usually roughened or have an emery cloth or the like (not shown) cemented thereto. And, to balance the weight of the jig 19, inclusive the plastic sheet, counter weights 43 are adjustably secured to threaded arms 44 fastened to the cross heads 12 by bolts 16 opposite the jig supporting arms 15 and 17, respectively.

Since the operation of this invention is essentially the same as that described in the above mentioned application Serial No. 585,504, only a brief survey of its advantages thereover shall be made for the purpose of summary and simplification.

Particularly shall be pointed out that by using a female forming jig the sheet to be formed can be inserted therein more conveniently and speedier than is possible with other known apparatus, because by inserting the clamping frame which fits into the base frame and is clamped readily in place, the sheet will be held simultaneously all around its edges, as compared with separate strapping means used for known apparatus. Besides, owing to the jig cover, sufficiently spaced from, but enclosing the outer surface of the sheet, which would be particularly exposed to surrounding air currents, the proper forming temperature of the sheet can be held much longer, whereby the forming process will be improved and simplified. Because of the fact that the sheet does not come in contact with the jig, except at its edges, no mark-offs on the finished product are possible so that a clear, optically perfect product is obtained.

While in accordance with the Patent Statutes one best known embodiment of the invention has been illustrated and described in detail, it is to be particularly understood that the invention is not limited thereto or thereby, but that the inventive scope is defined in the appended claims.

I claim:

1. An apparatus including a forming jig, a rotatable shaft supporting the forming jig, means for rotating the shaft to centrifugally form thermoplastic sheet material carried on the jig into canopies and like articles, the forming jig comprising a female part for supporting the sheet material, the forming jig having opposed longitudinal members, and curved transverse members connecting the longitudinal members near their ends, said jig contacting the sheet material only at its edge portions, said jig being mounted so that the centrifugal force on the sheet material tends to maintain the edge portions of the sheet material in contact with the jig, a male frame counterpart shaped to contact solely with the edge portions of the sheet material, and means for releasably clamping the male frame counterpart to hold the edge portions of the sheet material against the jig.

2. Apparatus for centrifugally forming sheet material into canopies and like articles comprising a jig having a central opening, means for clamping a plastic sheet around its edges to the jig and leaving the center of the sheet free, said last named means including a male jig section for defining the initial shape of the center section of the plastic sheet and means for rotating the jig about an axis so positioned that the sheet is centrifugally formed through the central opening in the jig, and with the jig defining the outside dimensions of the edges of sheet as formed.

3. Apparatus for forming a plastic sheet into a canopy or the like comprising a jig having substantially U-shaped ends, opposed longitudinals connecting adjacent legs of the U-shaped ends together, the jig being adapted to have a plastic sheet draped in substantially trough shape into it so that the sheet has inner and outer surfaces, means for engaging with the inside surface of the trough-shaped sheet for releasably clamping the edges of the outer surface of the sheet to the ends and longitudinals of the jig and leaving unsupported the remainder of the sheet, means for rotating the jig around an axis positioned adjacent the open side of the trough-shaped sheet to centrifugally form the unsupported portion of the sheet, and a cover around the jig but spaced from the sheet to be formed and as formed to keep at least the outside surface of the sheet enclosed and protected against rapid heat dissipation and the flow of air thereover, the jig having a member with a window formed therein for observing the sheet while it is formed.

4. Apparatus for forming a plastic sheet into a canopy or the like comprising a jig having substantially U-shaped ends, opposed longitudinals connecting adjacent legs of the U-shaped ends together, the jig being adapted to have a plastic sheet draped in substantially trough shape into it so that the sheet has inner and outer surfaces, means for engaging with the inside surface of the trough-shaped sheet for releasably clamping the edges of the outer surface of the sheet to the ends and longitudinals of the jig and leaving unsupported the remainder of the sheet, means for rotating the jig around an axis positioned to centrifugally shape the unsupported portion of the trough-shaped sheet to enlarge the trough thereof, and a cover around the jig but spaced from the sheet to be formed and as formed to keep at least the outside surface of the sheet enclosed and protected against rapid heat dissipation and the flow of air thereover, said cover having a window for observing the sheet while it is formed.

5. Apparatus for forming a plastic sheet into a canopy or the like comprising a jig having substantially U-shaped ends, opposed longitudinals connecting adjacent legs of the U-shaped ends together, the jig being adapted to have a plastic sheet draped in substantially trough shape into it so that the sheet has inner and outer surfaces, means for engaging with the inside surface of the trough-shaped sheet for releasably clamping the edges of the outer surface of the sheet to the ends and longitudinals of the jig and leaving unsupported the remainder of the sheet, means for rotating the jig around an axis positioned to centrifugally shape the unsupported portion of the trough-shaped sheet to enlarge the trough thereof, and a cover around the jig but spaced from the sheet to be formed and as formed to keep at least the outside surface of the sheet enclosed and protected against rapid heat dissipation and the flow of air thereover.

6. Apparatus for forming a plastic sheet into a canopy or the like comprising a jig having substantially U-shaped ends, opposed longitudinals connecting adjacent legs of the U-shaped ends together, the jig being adapted to have a plastic sheet draped in substantially trough shape into it so that the sheet has inner and outer surfaces, means for engaging with the inside surface of the trough-shaped sheet for releasably clamping the edges of the outer surface of the sheet to the ends and longitudinals of the jig and leaving unsupported the remainder of the sheet, and means for rotating the jig around an axis positioned to centrifugally shape the unsupported portion of the trough-shaped sheet to enlarge the trough thereof.

7. Apparatus as in claim 2 wherein a cover is secured to the jig for preventing rapid heat dissipation of a sheet associated with the apparatus.

MAURITZ P. H. PETERSON.

REFERENCES CITED

The following references are of record in the file of this patent:

UNITED STATES PATENTS

| Number | Name | Date |
|---|---|---|
| 765,570 | Fenn | July 19, 1904 |
| 2,367,642 | Helwig | Jan. 16, 1945 |